United States Patent [19]

Fernalld, Jr.

[11] 4,249,189

[45] Feb. 3, 1981

[54] INK JET PRINTER HAVING IMPROVED DEFLECTION ELECTRODE

[75] Inventor: Clifford S. Fernalld, Jr., Xenia, Ohio

[73] Assignee: The Mead Corporation, Dayton, Ohio

[21] Appl. No.: 71,918

[22] Filed: Sep. 4, 1979

[51] Int. Cl.³ .......... G01D 15/18

[52] U.S. Cl. .......... 346/75

[58] Field of Search .......... 346/75

[56] References Cited

U.S. PATENT DOCUMENTS

| | | | |
|---|---|---|---|
| 3,701,998 | 10/1972 | Mathis | 346/75 |
| 4,074,278 | 2/1978 | Robertson | 346/75 |
| 4,085,409 | 4/1978 | Paranjpe | 346/75 |
| 4,122,458 | 10/1978 | Paranjpe | 346/75 |
| 4,167,741 | 9/1979 | Heard | 346/75 |

*Primary Examiner*—Joseph W. Hartary
*Attorney, Agent, or Firm*—Biebel, French & Nauman

[57] ABSTRACT

An ink jet printer for depositing drops from a plurality of jet drop streams on a print receiving medium includes a print head means for generating a plurality of jet drop streams arranged in a row, with each stream directed at the print receiving medium. A means is provided for selectively charging drops in the jet drop streams. A catcher means extends along the row of jet drop streams for catching deflected drops. The catcher means is electrically conductive and is maintained at a predetermined electrical potential. A deflection electrode means, comprising a strip of electrically resistive material, extends along the row of jet drop sreams on the opposite side of the row from the catcher means. First and second electrical deflection potentials are applied to opposite ends of the strip of electrically resistive material, whereby a deflection field between the deflection electrode means and the catcher means is created, with the strength of the field along the row of jet drop streams being substantially uniform. Uniformity is obtained by selecting the first and second electrical deflection potentials to compensate for variations in the distance between the catcher means and the deflection electrode means along the row of jet drop streams.

12 Claims, 3 Drawing Figures

Δd
60
d
100
70
V1
86
74
96
68
104
64
V3

V3
V4
74
76
104
60
66
68
102
96
72
70
V1
V2

INK JET PRINTER HAVING IMPROVED DEFLECTION ELECTRODE

BACKGROUND OF THE INVENTION

The present invention relates generally to ink jet printers and, more particularly, to a deflection electrode arrangement for an ink jet printer which provides for correction of any misalignment between the deflection electrode and the drop catchers.

As shown in U.S. Pat. No. 3,701,998, issued Oct. 31, 1972, to Mathis, ink jet printers of the type to which the present invention is directed include a print head which generates a plurality of jet drop streams which are directed at a print receiving medium. The jet drop streams are arranged in one or more rows. Deflection electrodes are positioned adjacent each of the jet drop streams for selectively charging drops in the streams. The drop streams thereafter pass through an electrical deflection field which separates the drops into two or more sets of drop trajectories. As shown in the Mathis patent, the deflection fields for a two-row printer may be produced by positioning a deflection electrode between the rows of jet drop streams and supplying a deflection potential to the electrode, which potential tends to deflect charged drops in the streams outward, away from the electrode. Electrically grounded drop catchers are positioned outwardly from the drop streams such that charged drops are deflected to the catchers and are thereby prevented from striking the print receiving medium. As shown in U.S. Pat. No. 4,085,409, issued Apr. 18, 1978, to Suresh C. Paranjpe, by selectively applying a plurality of charge levels to the drops in the jet drop streams, the drops may be deflected in each stream sufficiently such that they strike the catcher, or deflected to a lesser degree, such that they strike the print receiving medium at various ones of a number of print positions. Prior art deflection electrodes, such as shown in the Mathis patent, typically comprise a thin strip or ribbon of electrically conductive material, such as stainless steel. With such deflection electrodes, the deflection potential presented by the electrode is substantially constant along the length of the electrode.

The deflection field experienced by each of the drops in the jet drop streams is a function of the voltage differential between the deflection electrode and a catcher and also of the spacing between the electrode and the catcher, since $E=V/d$, where E is electrical field strength, V is potential differential, and d is the spacing between the deflection electrode and the catcher. In order for charged drops in the jet drop streams to be deflected outwardly by a uniform deflection distance, the electric deflection field must be uniform along the row of jet drop streams. As a consequence, great care has been taken to assure that the deflection electrode and each of the catchers are properly aligned and that the spacing between the deflection electrode and each catcher is accurate and uniform along the entire row of jet drop streams. Thus extreme care has been necessitated in positioning and aligning the catchers with respect to the deflection electrode after servicing of a printer.

It is seen, therefore, that there is a need for an ink jet printer in which alignment between the deflection electrode and the catchers is not critical to proper deflection of charged drops in the jet drop streams.

SUMMARY OF THE INVENTION

An ink jet printer for depositing drops from a plurality of jet drop streams on a print receiving medium includes a print head means for generating a plurality of jet drop streams arranged in a row, with each such stream directed at the print receiving medium. A means is provided for selectively charging drops in the jet drop streams. A catcher means extends along the row of jet drop streams for catching drops deflected thereto. The catcher means is electrically conductive and is maintained at a predetermined electrical potential. A deflection electrode means extends along the row of jet drop streams on the opposite side of the row from the catcher means. The deflection electrode means produces an electrical deflection field extending between the catcher means and the deflection electrode means. A means is provided for applying a deflection potential to the deflection electrode means which is variable along the length of the deflection electrode means, whereby the deflection potential along the deflection electrode means may be selected to compensate for variations in the displacement between the deflection electrode means and the catcher means along the row of jet drop streams.

The deflection electrode means may comprise a strip of electrically resistive material having a substantially uniform electrical resistance per unit length. The means for applying a deflection potential to the deflection electrode means comprises means for applying first and second electrical deflection potentials to opposite ends of the strip of electrically resistive material. The first and second electrical deflection potentials may be independently adjustable.

The strip of electrically resistive material may be coated with a layer of electrically insulating material along the surface thereof adjacent the row of jet drop streams, whereby any deposition of drops thereon does not affect the electrical resistance of the strip.

Accordingly, it is an object of the present invention to provide an ink jet printer incorporating a deflection electrode and at least one catcher for creating a deflection field through which drops from a row of jet drop streams pass; to provide such a printer in which charged drops are directed toward the catcher; to provide such a printer in which the deflection electrode is formed of an electrically resistive material and is connected at each end thereof to independently adjustable deflection potentials; and to provide such a printer in which the deflection potentials may be adjusted in order to compensate for misalignment of the deflection electrode and an adjacent catcher.

Other objects and advantages of the invention will be apparent from the following description, the accompanying drawings and the appended claims.

DETAILED DESCRIPTION OF THE PREFERRED EMBODIMENT

Figure 1:
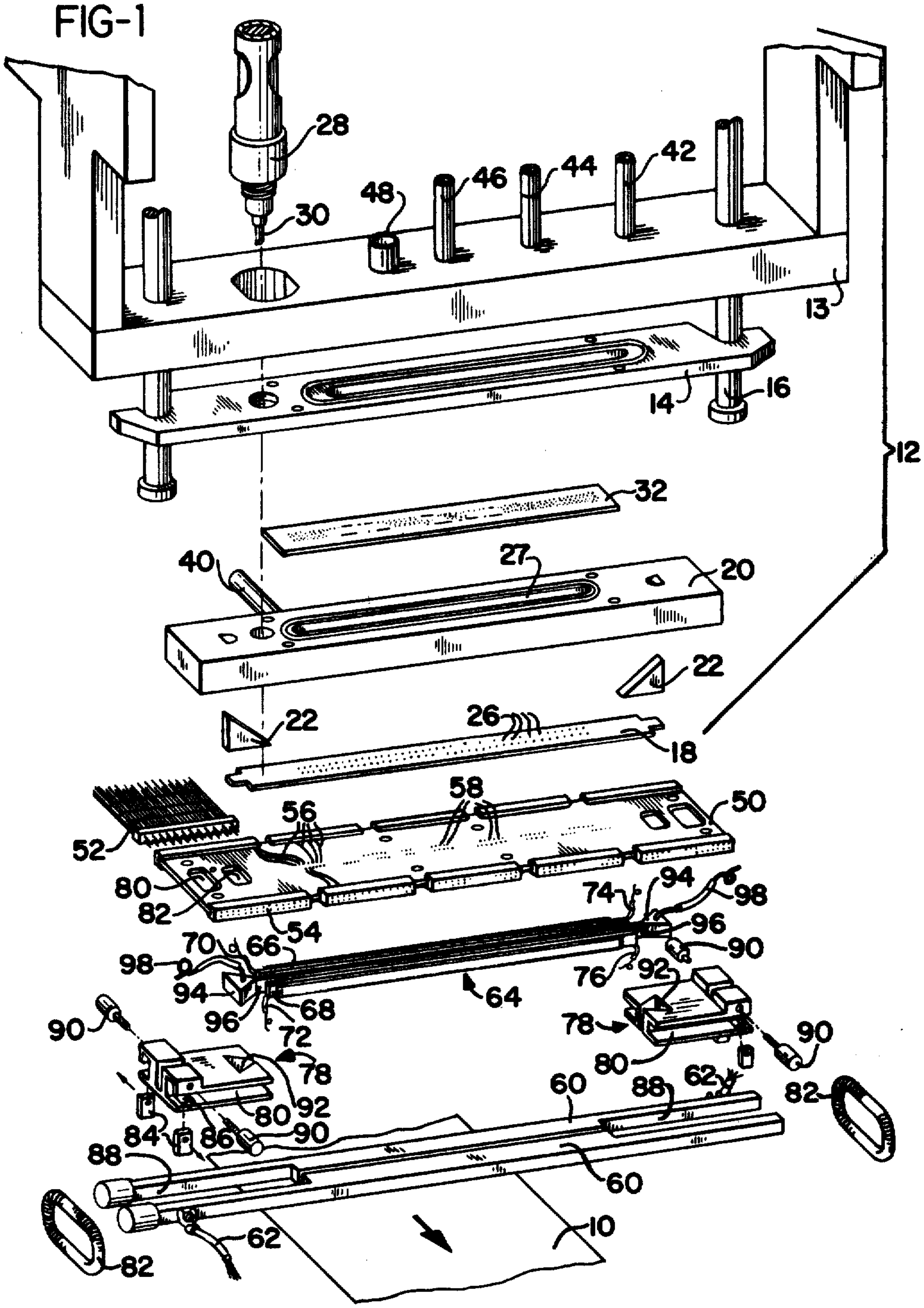
FIG. 1 is an exploded perspective view of an ink jet printer constructed according to the present invention.

Reference is now made to FIG. 1 which illustrates an ink jet printer for depositing ink drops on a print receiving medium, such as moving paper web 10. A print head means 12 generates a plurality of jet drop streams which are arranged in a pair of parallel rows. Each such stream is directed at the print receiving medium 10. The various elements of the print head means 12 are assembled for support by a support bar 13. Assembly thereto is accomplished by attaching the elements by means of machine screws (not shown) to a clamp bar 14 which is in turn connected to the support bar 12 by means of clamp rods 16.

An orifice plate 18 is soldered, welded, or otherwise bonded to fluid supply manifold 20 with a pair of wedge-shaped acoustical dampers 22 therebetween. Orifice plate 18 is preferably formed of a relatively stiff material, such as stainless steel or nickel coated beryllium-copper, but is relatively thin to provide the required flexibility for stimulation of the jet drop streams.

Orifice plate 18 defines two parallel rows of orifices 26 through which the ink supplied to the fluid reservoir 27 in manifold 20 passes. Orifice plate 18 is stimulated by stimulator 28 which is threaded into clamp bar 14 to carry a stimulation probe 30 through the manifold 20 into direct contact with plate 18. Orifice plate 18, manifold 20, clamp bar 14, and filter plate 32 comprise a clean package which is preassembled and kept closed to prevent dirt or foreign material from reaching and clogging orifices 26. Service connections for the print head means include conduit 40 for flushing the reservoir 27, as well as fluid supply tube 42, air exhaust and inlet tubes 44 and 46, and tube 48 for connection to a pressure transducer (not shown).

A means for selectively charging drops in the jet drop streams emerging through orifices 26 comprises a charge ring plate 50 and electrical connector 52 which mates with receptacles 54. Although only one such connector 52 is illustrated, it will be appreciated that additional connectors are provided for each of the receptacles 54. Conductors 56 on charge ring plate 50 provide electrical connection between connectors 52 and the charge rings 58 which line openings in plate 50 align with orifices 26. Each of the drop streams passes through a charge ring such that drops formed in the vicinity of the charge rings 58 are selectively charged by the charge potentials on the charge rings. Charge potentials are supplied via connectors 52 from a charge signal source, such as a computer or optical scanning device. Reference is made to the Mathis patent for a more detailed description of the print head means 10 and the means for selectively charging drops in the jet drop streams.

A catcher means including a pair of drop catchers 60 extends along the rows of jet drop streams. The drop catchers 60 are spaced outwardly from the rows of jet drop streams and are provided for catching drops deflected thereto. The catchers 60 are electrically conductive and are maintained at a predetermined electrical potential by electrical conductors 62. The predetermined potential may be selected as ground potential. Catchers 60 may typically take the form illustrated in greater detail in the cited Mathis patent.

A deflection electrode means 64 extends between the rows of jet drop streams and is provided for producing electrical deflection fields which extend between the deflection electrode means 64 and each of the pair of drop catchers 60. As described more completely below, the deflection electrode means includes first and second parallel electrodes 66 and 68, with each of the electrodes being positioned adjacent a respective one of the pair of parallel rows of jet drop streams. A means for applying deflection potentials to the first and second parallel electrodes 66 and 68, which potentials are variable along the length of electrodes 66 and 68, as described below, may comprise voltage sources $V_1$, $V_2$, $V_3$, and $V_4$ (FIG. 2), which are electrically connected to electrodes 66 and 68 by means of electrical conductors 70, 72, 74, and 76.

Catchers 60 are positioned outwardly of the rows of jet drop streams and are supported by holders 78 which are fastened directly to fluid supply manifold 20 by means of spacers (not shown) which extend through apertures 80 and 82 in charge ring plate 50. Deflection electrode means 64 is also supported by holders 78 such that it extends longitudinally between catchers 60.

Catchers 60 are laterally adjustable relative to deflection electrode means 64. This adjustability is accomplished by assembling the printer with catchers 60 resting in slots 80 of holders 78. Catchers 60 are urged inward by means of a pair of elastic bands 82. Adjusting blocks 84 are inserted through openings 86 to bear against faces 88 of catchers 60. Adjusting screws 90 drive adjusting blocks 84 and catchers 60 outwardly against elastic bands 82. Holders 78 are made of insulative material which may, for example, be any available reinforced plastic board.

Each of the holders 78 defined a generally triangular recess 92 into which mating deflection electrode means end portions 94 are received for positioning the deflection electrode means 64 properly between the catchers 60. End portions 94 are formed of conductive material and are attached to an electrically conductive shield 96 extending between the first and second parallel electrodes 66 and 68. Conductors 98 are connected to end portions 94 and provide a means for grounding the shield 96.

Figure 3:
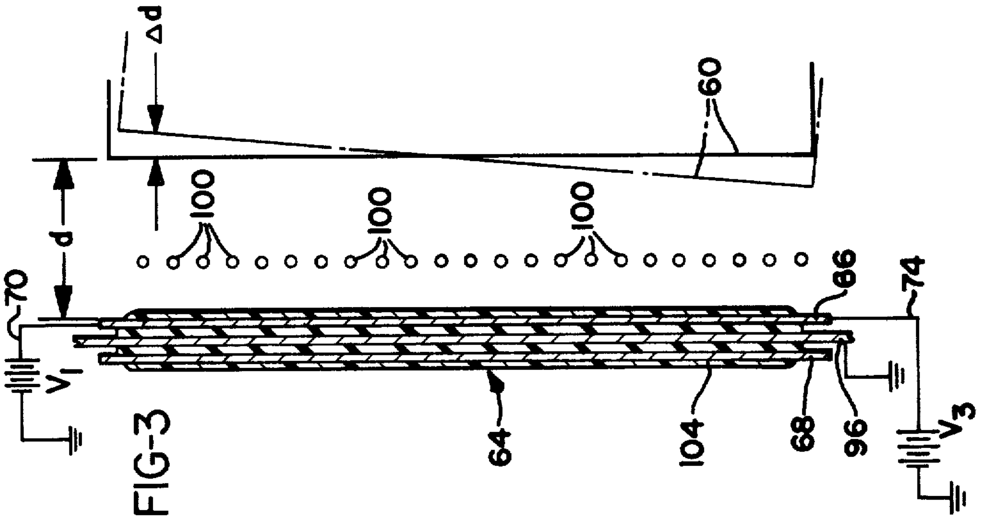
FIG. 3 is a view, similar to FIG. 2, illustrating the manner in which the deflection electrode arrangement of the present invention provides a substantially uniform electrical deflection field.
Figure 2:
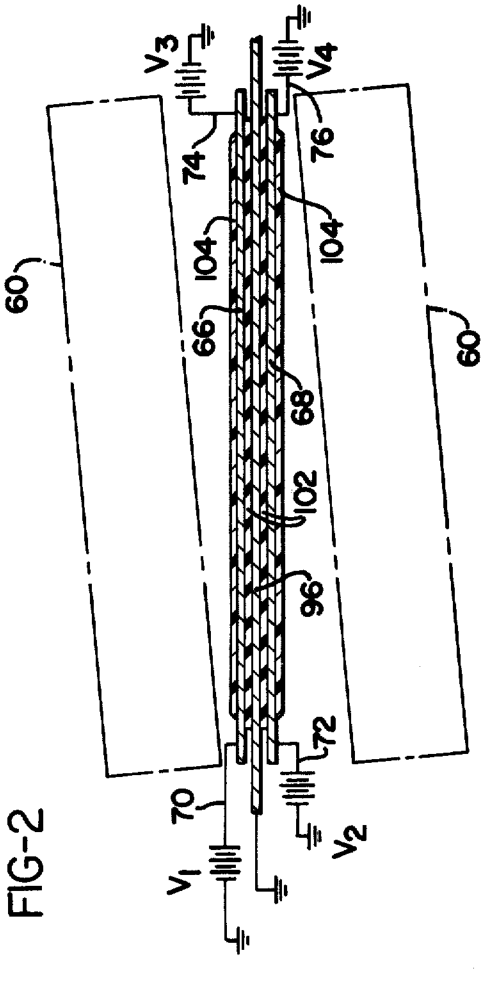
FIG. 2 is a diagrammatic view of the deflection electrode and catchers, as seen from above, with the deflection electrode in section.

Reference is now made to FIGS. 2 and 3, which illustrate the deflection electrode means 64 in greater detail and the manner in which the deflection electrode means provides for uniform electrical deflection fields along the rows of jet drop streams. One of the rows of streams 100 is illustrated diagrammatically in FIG. 3. During assembly of the printer it may happen that one or both of the catchers 60 are not properly positioned parallel to the deflection electrode means 64 as shown diagrammatically by the dashed lines. If the deflection potential along the electrode is constant along its length, such a misalignment of the opposing catcher 60 results in a variation in the deflection field along the row of jet drop streams 100. The deflection field between properly aligned electrode 66 and catcher 60 is defined by:

$E=V/d$, where $E$=deflection field, $V$=voltage differential between deflection electrode 66 and catcher 60, and $d$=distance between deflection electrode 66 and catcher 60.

If the distance d at a given point along the row is greater than the nominal distance between a properly aligned catcher and deflection electrode, the field at that point will be $$E'=V/(d+\Delta d),$$

where Δd is the incremental increase in the distance between the catcher and the deflection electrode.

In order to increase the field at this point to the desired level E, the potential between the deflection electrode and the catcher is increased by ΔV, such that $$E'=E=(V+\Delta V)/(d+\Delta d)=V/d$$

Therefore, $$V(1+\Delta V/V)/d(1+\Delta d/d)=V/d$$

$$(1+\Delta V/V)/(1+\Delta d/d)=1$$

Consequently, $$\Delta V/V=\Delta d/d$$

Thus, an increase in the distance between the deflection electrode and the catcher at a specific point may be compensated by a proportionate increase in the deflection potential at that point.

This compensation technique may be implemented by the deflection electrode arrangement illustrated in FIGS. 2 and 3. The electrodes 66 comprises a strip of electrically resistive material which may provide a uniform electrical resistance per unit length. First and second independently adjustable electrical deflection potentials $V_1$ and $V_3$ are applied to opposite ends of the strip of electrically resistive material 66. By adjusting the potentials $V_1$ and $V_3$ to produce uniform deflection fields at the ends of the electrodes 66, a uniform deflection field is produced along the entire length of the row of jet drop streams 100, since the deflection potential presented along electrode 66 will vary uniformly from a value of $V_1$ at its upper end to a value of $V_3$ at its lower end, in correspondence with the variation of the displacement differential d.

By making the deflection potentials $V_1$, $V_2$, $V_3$, and $V_4$ independently adjustable, errors in the position of each of the catchers 60 may be compensated on both sides of the deflection electrode means. Thus, in FIG. 2, deflection potential $V_3$ would be substantially greater than deflection potential $V_1$, while deflection potential $V_2$ would be substantially greater than deflection potential $V_4$. In order to ensure that the deflection field produced by one of the electrodes 66 and 68 does not influence the deflection field produced by the other of the electrodes, the grounded electrically conductive shield 96 is positioned between the electrodes 66 and 68. Nonconductive insulating material 102 is sandwiched between electrodes 66 and 68 and shield 96 to prevent grounded shield 96 from shorting out the electrodes. Additionally, layers 104 of insulating material may be coated onto the outer surfaces of the electrodes 66 and 68 to prevent drops of conductive ink which may strike the deflection electrode means 64 from shorting out any portions of the electrodes 66 and 68.

For clarity of illustration, catchers 60 are shown as grossly misaligned. Since the positional errors which occur in positioning the catchers 60 are relatively small, the differences between potentials $V_1$ and $V_3$ are between potentials $V_2$ and $V_4$ are relatively small. As a consequence, the fields created parallel to the deflection electrodes by virtue of the differing potential levels along the electrodes are extremely small and have a negligible effect upon the trajectories of the drops.

While the form of apparatus herein described constitutes a preferred embodiment of the invention, it is to be understood that the invention is not limited to this precise form of apparatus, and that changes may be made therein without departing from the scope of the invention.

What is claimed is:

1. An ink jet printer for depositing drops from a plurality of jet drop streams on a print receiving medium, comprising:

print head means for generating a plurality of jet drop streams arranged in a row, each such stream directed at said print receiving medium, means for selectively charging drops in said jet drop streams, catcher means extending along said row of jet drop streams for catching drops deflected thereto, said catcher means being electrically conductive and maintained at a predetermined electrical potential, deflection electrode means extending along said row of jet drop streams on the opposite side of said row from aid catcher means, said deflection electrode means comprising a strip of electrically resistive material, and means for applying first and second electrical deflection potentials to the opposite ends of said strip of electrically resistive material, whereby a deflection field between said deflection electrode means and said catcher means is created with the strength of said field along said row of jet drop streams being substantially uniform by selecting said first and second electrical deflection potentials to compensate for variations in the distance between said catcher means and said deflection electrode means along said row of jet drop streams.

2. The ink jet printer of claim 1 in which said first and second electrical deflection potentials are independently adjustable.

3. The ink jet printer of claim 1 in which said strip of electrically resistive material is coated with a layer of electrically insulating material along the surface thereof adjacent said row of jet drop streams, whereby any deposition of drops thereon does not affect the resistance of said strip.

4. The ink jet printer of claim 1 in which said strip of electrically resistive material has a substantially uniform electrical resistance per unit length.

5. An ink jet printer for depositing drops from a plurality of jet drop streams on a print receiving medium, comprising, print head means for generating a plurality of jet drop streams arranged in a row, each such stream directed at said print receiving medium, means for selectively charging drops in said jet drop streams, catcher means extending along said row of jet drop streams for catching drops deflected thereto, said catcher means being electrically conductive and maintained at a predetermined electrical potential, deflection electrode means, extending along said row of jet drop streams on the opposite side of said row from said catcher means, for producing an electrical deflection field extending between said catcher means and said deflection electrode means, and means for applying a deflection potential to said deflection electrode means which is variable along the length of said deflection electrode means, whereby the deflection potential along said deflection electrode means may be selected to compensate for variations in the displacement between said deflection electrode means and said catcher means along said row of jet drop streams.

6. The ink jet printer of claim 5 in which said deflection electrode means comprises a strip of electrically resistive material and in which said means for applying a deflection potential to said deflection electrode means comprises means for applying first and second electrical deflection potentials to opposite ends of said strip of electrically resistive material.

7. The ink jet printer of claim 6 in which said first and second electrical deflection potentials are independently adjustable.

8. An ink jet printer for depositing drops from a plurality of jet drop streams on a print receiving medium, comprising, print head means for generating a plurality of jet drop streams arranged in a pair of parallel rows, each such stream directed at said parint receiving medium, means for selectively charging drops in said jet drop streams, catcher means, including a pair of catchers, extending along said rows of jet drop streams and spaced outwardly therefrom, for catching drops deflected to said drop catchers, said drop catchers being electrically conductive and maintained at a predetermined electrical potential, deflection electrode means extending between said rows of jet drop streams, for producing electrical deflection fields extending between said deflection electrode means and each of said pair of drop catchers, said deflection electrode means including first and second parallel electrodes, said electrodes each positioned adjacent a respective one of said pair of parallel rows of jet drop streams, and means for applying deflection potentials to said first and second parallel electrodes which are variable along the length of said first and second parallel electrodes, whereby the deflection potential along said first and second parallel electrodes may be selected to compensate for variations in the spacing between said first and second parallel electrodes and said pair of drop catchers along said rows of jet drop streams.

9. The ink jet printer of claim 8 in which said first and second parallel electrodes each comprise a strip of electrically resistive material and in which said means for applying deflection potentials to said first and second parallel electrodes comprises means for applying first and second electrical deflection potentials to opposite ends of said first electrode, and means for applying third and fourth electrical deflection potentials to opposite ends of said second electrode.

10. The ink jet printer of claim 9 in which said first, second, third, and fourth electrical deflection potentials are independently adjustable.

11. The ink jet printer of claim 8 in which said deflection electrode means further comprises electrical insulator means positioned between said first and second parallel electrodes and providing electrical insulation therebetween.

12. The ink jet printer of claim 11 in which said deflection electrode means further comprises an electrically conductive shield extending between said first and second parallel electrodes and means grounding said shield, whereby said first and second parallel electrodes each produce a deflection field affecting only one of said pair of parallel rows of jet drop streams.

* * * * *